United States Patent
Jacobson et al.

(10) Patent No.: US 8,923,293 B2
(45) Date of Patent: *Dec. 30, 2014

(54) ADAPTIVE MULTI-INTERFACE USE FOR CONTENT NETWORKING

(75) Inventors: Van L. Jacobson, Woodside, CA (US); James D. Thornton, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 765 days.

This patent is subject to a terminal disclaimer.

(21) Appl. No.: 12/603,336

(22) Filed: Oct. 21, 2009

(65) Prior Publication Data

US 2011/0090908 A1 Apr. 21, 2011

(51) Int. Cl.
| | |
|---|---|
| *H04L 12/56* | (2006.01) |
| *G06F 15/173* | (2006.01) |
| *H04L 12/721* | (2013.01) |
| *H04L 29/08* | (2006.01) |
| *H04L 12/741* | (2013.01) |
| *G06F 17/30* | (2006.01) |
| *H04L 29/12* | (2006.01) |

(52) U.S. Cl.
CPC .......... *G06F 17/30861* (2013.01); *H04L 45/12* (2013.01); *H04L 67/327* (2013.01); *H04L 45/54* (2013.01); *H04L 29/12066* (2013.01); *H04L 61/1511* (2013.01); *H04L 45/70* (2013.01)
USPC .......................................................... 370/392

(58) Field of Classification Search
None
See application file for complete search history.

(56) References Cited

U.S. PATENT DOCUMENTS

| | | | |
|---|---|---|---|
| 6,981,029 B1 | 12/2005 | Menditto | |
| 2005/0198351 A1* | 9/2005 | Nog et al. | 709/232 |
| 2007/0239892 A1* | 10/2007 | Ott et al. | 709/242 |
| 2010/0169503 A1* | 7/2010 | Kollmansberger et al. | 709/231 |
| 2010/0281051 A1* | 11/2010 | Sheffi et al. | 707/770 |
| 2011/0016307 A1* | 1/2011 | Killian et al. | 713/151 |

OTHER PUBLICATIONS

Fall, K. et al., "DTN: an architectural retrospective", Selected areas in communications, IEEE Journal on, vol. 28, No. 5, Jun. 1, 2008, pp. 828-835.

Gritter, M. et al., "An Architecture for content routing support in the Internet", Proceedings of 3rd Usenix Symposium on Internet Technologies and Systems, 2001, pp. 37-48.

* cited by examiner

*Primary Examiner* — Marcus R Smith
(74) *Attorney, Agent, or Firm* — Shun Yao; Park, Vaughan, Fleming & Dowler LLP

(57) ABSTRACT

One embodiment provides a system that forwards a packet with a hierarchically structured variable-length identifier (HSVLI) in a network. An HSVLI indicates a piece of content and indicates a hierarchical structure of contiguous components ordered from a most general level to a most specific level. The length of the HSVLI is not fixed. During operation, the system receives a packet which contains an interest for a piece of content with an HSVLI. Subsequently, the system determines forwarding information for the HSVLI based on one or more of: knowledge of content which matches the HSVLI, a forwarding policy, and contextual information about the network. Next, the system configures a forwarding engine with the forwarding information. The system then forwards the packet based on the forwarding information.

24 Claims, 6 Drawing Sheets

ADAPTIVE MULTI-INTERFACE USE FOR CONTENT NETWORKING

RELATED APPLICATION

The subject matter of this application is related to the subject matter in the following applications:

U.S. patent application Ser. No. 12/123,344, entitled "VOICE OVER CONTENT-CENTRIC NETWORKS," by inventors Paul Stewart, Van Jacobson, Michael Plass, and Diana Smetters, filed May 19, 2008;

U.S. patent application Ser. No. 12/332,560, entitled "METHOD AND APPARATUS FOR FACILITATING COMMUNICATION IN A CONTENT-CENTRIC NETWORK," by inventor Van Jacobson, filed Dec. 11, 2008; and U.S. patent application Ser. No. 12/565,005, entitled "SYSTEM FOR FORWARDING A PACKET WITH A VARIABLE-LENGTH IDENTIFIER," by inventor Van Jacobson, filed Sep. 23, 2009;

the disclosures of which are incorporated by reference in their entirety herein.

BACKGROUND

1. Field

The present disclosure relates generally to facilitating communication over a data network. More specifically, the present disclosure relates to adaptive use of multi-interface forwarding equipment in content-centric networking.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of content can only receive the content by explicitly requesting the content from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than the ARPAnet was designed for. Ideally, an Internet user should have access to any content, anywhere, at any time. Such access is difficult to guarantee with the current location/device-binding IP protocol.

Under current web-based naming structures, an idea of the host is implicit in the name which contains the corresponding content. For example, http://www.amazon.com/index.html can be found by contacting the machine www.amazon.com. However, this contact requires a domain name system (DNS) to translate a human-readable host name into an IP address (e.g., 209.34.123.178). In current computer systems, there is no way to refer to a piece of content without knowing what host that file is stored on, and even then the contents associated with that file might change.

In the current technology, forwarding is the process by which a node in a packet-switched network transmits a packet from a source to a destination. An Internet Protocol (IP) router typically receives a packet at one of its input ports (e.g., a network interface). Next, the router performs a lookup to identify an output port to which the packet should be forwarded based on the packet's destination address. However, existing routers do not provide a way to configure the forwarding engine to forward content interests that do not use conventional IP addresses.

SUMMARY

One embodiment provides a system that forwards a packet with a hierarchically structured variable-length identifier (HSVLI) in a network. An HSVLI indicates a piece of content and indicates a hierarchical structure of contiguous components ordered from a most general level to a most specific level. The length of the HSVLI is not fixed. During operation, the system receives a packet which contains an interest for a piece of content with an HSVLI. Subsequently, the system determines forwarding information for the HSVLI based on one or more of: knowledge of content which matches the HSVLI, a forwarding policy, and contextual information about the network. Next, the system configures a forwarding engine with the forwarding information. The system then forwards the packet based on the forwarding information.

In some embodiments, knowledge of content which matches the HSVLI includes one or more of: location of content which matches the HSVLI, availability of content which matches the HSVLI, and importance or priority of content which matches the HSVLI.

In some embodiments, one or more components of the HSVLI include a domain name system (DNS) name, and determining the forwarding information includes determining an output interface based on the DNS name in the HSVLI.

In some embodiments, the policy includes one or more of: a policy rule on content which matches the HSVLI, a security constraint on content which matches the HSVLI, and a strategy rule to discover a source of content which matches the HSVLI.

In some embodiments, contextual information includes information about one or more of: physical layer connectivity, which includes a WiFi connectivity, a local-area network (LAN) connectivity, a wide-area network (WAN) connectivity, and other wired or wireless connectivity; a peer node which is likely to store content which matches the HSVLI; network costs; network latency; and battery status.

In some embodiments, the configuration of the forwarding engine with the forwarding information is in response to one or more of: a status change of the local network, execution of a routing protocol based on information received from another node in the network, and receiving statistical information indicating delay associated with one or more output interfaces.

In some embodiments, the system periodically or continually updates a database used to determine forwarding information by discovering nodes in the network, and establishing a secure tunnel with a discovered node to receive the content.

In some embodiments, the hierarchical structure includes one or more of: a globally routable name, an organizational name, a version identifier, and a digest.

In some embodiments, the system forwards a packet through multiple output interfaces simultaneously.

In some embodiments, the system receives contextual and policy information from a node and virally propagates the contextual and policy information to another node.

BRIEF DESCRIPTION OF THE FIGURES

In the figures, like reference numerals refer to the same figure elements.

Figure 1:
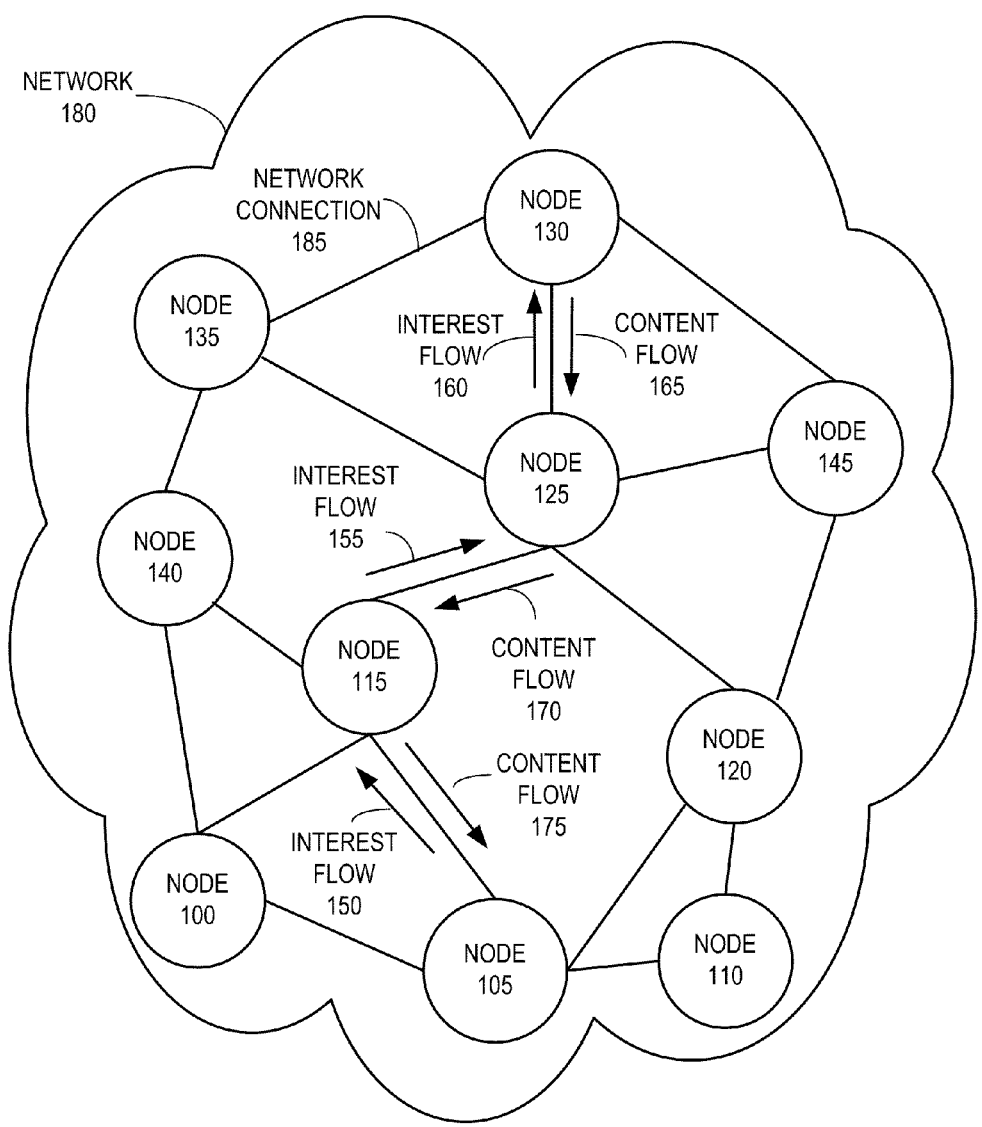
FIG. 1 illustrates an exemplary network where packets have HSVLIs in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

DETAILED DESCRIPTION

Overview

Embodiments of the present invention integrate different information flows to make decisions about how to configure forwarding of interests in particular content collections given multiple simultaneous connectivity options. Specifically, embodiments of the present invention facilitate configuring a forwarding engine that receives interests in content rather than addresses, where the configuration can be based on knowledge of the content, forwarding policies, and contextual information about the network. Embodiments of the present invention also facilitate finer-grained decision-making among multiple forwarding options.

Content centric networks—where routing is based on interests rather than addresses—bring a new approach to content transport. Instead of having network traffic viewed at the application level as end-to-end conversations over which content travels, content is requested or returned based in part on the name given to it, and the network is responsible for routing content from the provider to the consumer. Content includes data that can be transported in the communication system, and can be any form of data such as text, images, video, and/or audio. A consumer and a provider can be a person at a computer or an automated process inside or outside the network. In such a network, a piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD."

To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks which can couple one node to another node. Network 180 can be a local network, a super-network or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an interest in a piece of content and then send that interest to a node in network 180. The piece of content can be stored at a node in network 180 by a publisher or content provider, who can be located inside or outside the network. For example, in FIG. 1, the interest in a piece of content originates at node 105. If the content is not available at the node, the interest flows to one or more nodes coupled to the first node. For example, in FIG. 1, the interest flows (interest flow 150) to node 115, which does not have the content available. Next, the interest flows (interest flow 155) from node 105 to node 125, which again does not have the content. The interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the interest generation node (node 105) can participate in caching local copies of the content as it travels across the network. Caching reduces the network load for a second subscriber located in proximity to other subscribers by implicitly sharing access to the locally cached content Conventional packet forwarding is based on addresses assigned to nodes (or interfaces of nodes). In IP addressing, a hierarchical division of addresses is used so that the first portion of an address identifies a network, later portions identify a sub-network within that network, and the end of the address identifies a particular host within a sub-network. This arrangement allows the responsibility for assigning unique addresses to be delegated and thereby distributed so that the Internet can scale to worldwide size. It also enables scaling by limiting the amount of information an IP router needs to process when forwarding a packet to an output port.

In one embodiment, a packet is identified by an HSVLI with a hierarchical structure. The hierarchical structure of this HSVLI offers several advantages over the hierarchical structure of an IP address. Such an identifier can describe the structure explicitly through the name rather than implicitly through an IP routing table entry, which includes a subnet mask. Thus, in an HSVLI a naming mistake in the hierarchy can be detected through inspection, whereas an IP-based subnet mask mistake might route a packet to the wrong address and is more difficult to detect.

The forwarding engine can use various methods for matching the interest against an entry associated with forwarding information. For example, embodiments of the present invention can use a longest-prefix match lookup, which can be beneficial to the forwarding of packets with HSVLIs. For example, an interest in "/parc/home/smetters" will match both "/parc/home/smetters/test.txt" and "/parc/home/smetters/bar.txt" (that is, the packets identified by both these names). The longest match, in terms of the number of name components, is considered the best because it is the most specific.

Embodiments of the present invention use HSVLI-based routing process described above, with content retracing the interest path in reverse and caching at nodes. This novel routing mechanism can effectively prevent packet looping. A node can determine when a duplicate packet arrives by an alternate path and refuse to forward it. Thus it is not necessary to have the restriction of forwarding only based on a spanning tree, because multiple and possibly circular paths cannot cause packet looping and hence cost little. A node may identify and use multiple possible paths towards potential sources of content at once, which enables a variety of strategies that are not possible with conventional IP routing, where multicast-like routing or flooding is prohibited. For any particular content collection, there may be not just one but several possible options of interfaces over which to forward interests in the collection and they may have different properties. Embodiments of the present invention provide a means for configuring the forwarding engine to implement the best strategies for different situations.

In some embodiments of the present invention, the system can identify and simultaneously forward a packet along multiple paths toward potential sources of content. This simultaneous forwarding enables the system to accomplish a variety of strategies that are not possible with IP. For example, each path toward the content may have different properties, which the system can subsequently use for configuring the forwarding engine.

Multi-Interface Connectivity Model

Figure 2:
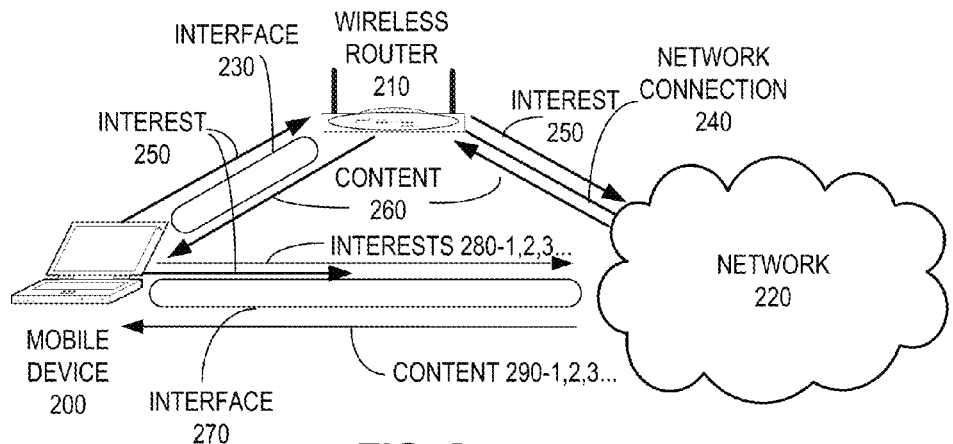
FIG. 2 illustrates an exemplary system for forwarding a packet with an HSVLI via two different routes to the same network in accordance with an embodiment.

FIG. 2 illustrates an exemplary system for forwarding a packet with an HSVLI via two different routes to the same network in accordance with an embodiment. In this example, a mobile device 200 is coupled to a wireless router 210 through an interface 230. Note that an interface can correspond to a port from which interests are sent and content is received. In turn, wireless router 210 is coupled to a network 220, which can be a content centric network, through a network connection 240. Mobile device 200 expresses an interest 250 in a piece of available content. Mobile device 200 can broadcast interest 250 over all available connectivity including but not limited to Wi-Fi, Bluetooth® and wireless carrier connections (i.e., cellular network connections). Any network node receiving the interest and having the content which matches the interest can respond. FIG. 2 shows that network 220 responds with content 260, which is forwarded through wireless router 210, back to mobile device 200.

One example of the criteria used in choosing an interface is the responsiveness to previous similar interests over that same interface. For example, in FIG. 2, interest 250 may initially be broadcast simultaneously on both interfaces 230 and 270. The system may then discover that content matching the interest is received faster through interface 270. The system will further forward subsequent interests 280-1, 2, 3, . . . only through interface 270 but not on interface 230. This example illustrates that the system can change its forwarding information based on the time it takes to receive matching content.

The system can also change its forwarding for an interest based on the cost of forwarding. An example of a policy leading to such a forwarding decision is a user preferring to access a large file over an available Wi-Fi hot spot connection instead of a more expensive carrier network.

FIG. 2 also illustrates a sequence of interests 280-1, 2, 3, . . . . Although the system broadcasts interest 250 through interfaces 230 and 270, the system decides to forward subsequent interests 280-1, 2, 3, . . . through interface 270. In addition, the system may also decide to forward these interests to interface 230 because of a better network condition such as lower latency. The system may determine this lower latency based on the content returned in response to interest 250 which is previously broadcast on interfaces 230 and 270. The system can also forward individual interests alternately on one interface or the other, or send them simultaneously over multiple interfaces using various multicast suppression techniques. For example, the system can continuously probe for better connectivity and forward interests according to the result of that probe. Note that in response to interests 280-1, 2, 3, . . . , the network returns content 290-1, 2, 3, . . . via interface 270 back to mobile device 200.

Figure 3:
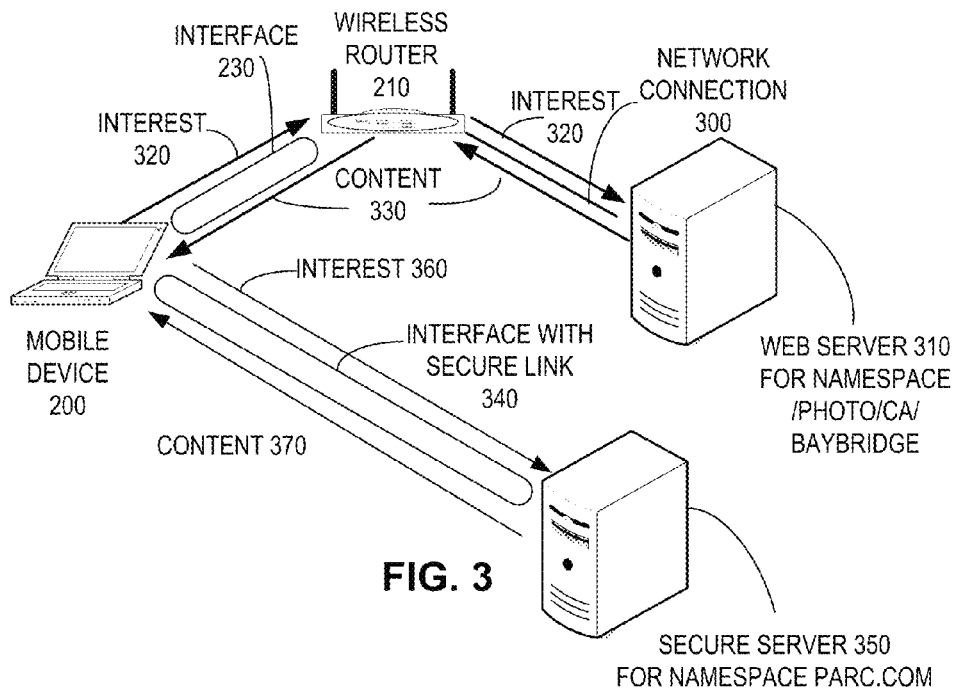
FIG. 3 illustrates an exemplary system for forwarding packets corresponding to two different interests in content in accordance with an embodiment.

FIG. 3 illustrates an exemplary system for forwarding packets corresponding to two different interests in content in accordance with an embodiment. In this example, mobile device 200 expresses an interest in content from two different namespaces ("parc.com" and "/photo/ca/baybridge") and pulls content from those two different namespaces over interface 230 and an interface with secure link 340 simultaneously. Such an example might arise if a user needs a secure tunnel to access "/parc.com/jim" while pulling pictures of the San Francisco Bay Bridge over a public Wi-Fi connection. A web server 310 for namespace "/photo/ca/baybridge" returns content matching an interest in pictures of the San Francisco Bay Bridge. A secure server 350 for namespace parc.com returns content matching an interest in "/parc.com/jim."

Embodiments of the present invention can configure the forwarding engine to forward interest packets over single or multiple interfaces, permitting fine-grained dynamic choices among multiple interfaces at a low level.

Architecture for Forwarding Interest Packets

Figure 4:
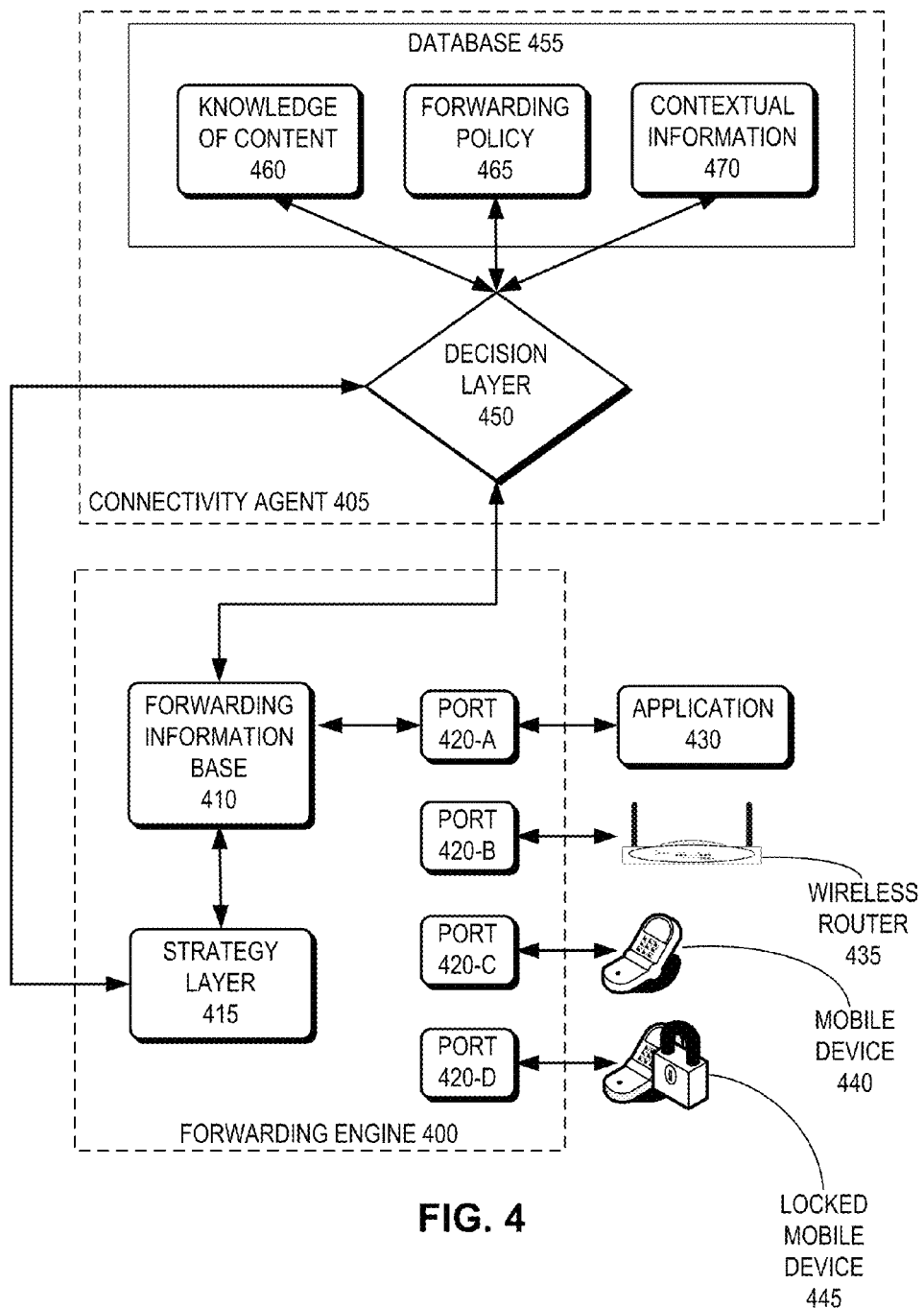
FIG. 4 presents an exemplary high-level architecture for forwarding a packet with an HSVLI in accordance with an embodiment.

FIG. 4 presents a high-level architecture illustrating the process of forwarding interest packets with an HSVLI in accordance with an embodiment. In this example, a packet forwarding system includes a forwarding engine 400 and a connectivity agent 405. Forwarding engine 400 includes a forwarding information base (FIB) 410, a strategy layer 415, and ports 420-A to 420-D, which are coupled respectively to an application 430, a wireless router 435, a mobile device 440, and a locked mobile device 445. In FIG. 4, bi-directional arrows between components denote two-way communication, programmable capabilities between a source and a destination arrow, or statistical feedback. Note that a port has an input side (i.e., an input port) and an output side (e.g., an output port).

FIB 410 is a database that can facilitate a lookup by a longest-match name prefix to determine which interface(s) an interest can be forwarded to. A strategy layer 415, which can be hardware or software, makes the fine-grained, packet-by-packet decision among multiple interfaces when the lookup produces multiple interfaces. Note that ports can communicate with individual applications, local networks, or with channels or tunnels, such as secure encrypted links.

Consider an interest arriving at port 420-A in forwarding engine 400. Typically, forwarding engine 400 includes a content store (CS, not shown) which is a local cache of previously received content. Assuming that the new interest arriving on port 420-A does not match any content in the CS, the interest is sent to FIB 410 for lookup. The system can use various lookup methods such as a longest-prefix match or an exact match. If the system does not find a match in FIB 410, the interest is sent to connectivity agent 405. Connectivity agent 405 can configure FIB 410 with forwarding information about a new content collection, assuming that the connectivity agent is able to identify a direction (e.g. interface/tunnel) toward that content collection.

In one embodiment, connectivity agent 405 determines one or more entries to be inserted into FIB 410, which indicate how to forward the interest based on the interest, content, and/or forwarding policy. The system can then re-inject the interest to forwarding engine 400, which can ensure a match for the interest.

If connectivity agent 405 cannot determine a way to forward the interest and reach the content collection, the interest can be discarded. Note that if the system is unable to match an interest in FIB 410, the system does not immediately discard the interest. Instead, the system transfers the interest to connectivity agent 405, which permits dynamic actions to identify a path that is not previously configured in FIB 410. For example, connectivity agent 405 can perform a domain name system (DNS) lookup on a prefix of the HSVLI associated with the interest for dynamic overlay routing in the public Internet. Forwarding engine 400 can still be configured to discard unmatched interests, for example, when the connectivity agent is not running.

If the system identifies a match for the interest in FIB 410, the interest and the corresponding one or more output port(s) can be sent to strategy layer 415. Strategy layer 415 uses the results of a successful lookup in FIB 410 to determine which output ports to use for the interest. Note that the system can still send the interest to the connectivity agent 405 despite a match being found in FIB 410. This operation facilitates opportunistic local broadcast to find content as well as dynamic configuration of specific paths to the content collection.

Connectivity agent 405 can control the implemented policy by configuring strategy layer 415 without having to process each individual packet. In one embodiment, connectivity agent 405 can configure strategy layer 415 with rules for choosing among multiple interfaces. For example, such rules can specify priority-based interface selection, a round-robin-sequence-based interface selection, or interface priorities based on fine-grained response timing. In another embodiment, configuration agent 405 can install an executable program in strategy layer 415 so that strategy layer 415 can execute the program to handle packets. Executable programs enable strategy layer 415 to have fine-grained control over where to forward packets.

Various methods can be used to configure forwarding engine 400 to transfer an interest to connectivity agent 405. For example, using longest-prefix matching, a zero-length prefix entry in FIB 410 will match any interest that does not match a longer "regular" entry. An interest that matches the zero-length prefix will cause the interest to be forwarded to the connectivity agent using normal processing (i.e., forwarding through an output port). Similarly, an interface associated with connectivity agent 405 can be added to the list for any entry in FIB 410. Adding this entry can allow configuration for specific paths as well as opportunistic broadcasts. In short, transfer of an interest from forwarding engine 400 to connectivity agent 405 can be through special-case handling in FIB 410 (as when there is no match at all) or through normal entries in FIB 410.

Connectivity Agent

Continuing with FIG. 4, connectivity agent 405 includes a decision layer 450, which sets forwarding rules based on database 455. Database 455 includes knowledge of content 460 which matches the interest (i.e., the HSVLI), forwarding policy 465, and contextual information 470 about the network. Embodiments of the present invention can use connectivity agent 405 to integrate information in database 455 and configure forwarding information base 410 to find content in a dynamic network environment.

Knowledge of content 460 which matches the interest includes information about the content, such the location(s) of the content as may be learned through a routing protocol, availability of content, and immediate importance or priority of content to an end user. There are many different ways to do routing to propagate and discover information about locations and availability of content.

Forwarding policy 465 can include policy rules, security constraints on specific collections of content (such as personal information), and generic strategy rules (e.g., try all output ports to discover the fastest source of content in a collection). The system can identifying particular collections based on the prefix of the HSVLI and can associate a policy rule, a constraint, and a strategy with that prefix.

Contextual information 470 about the network can include information about available physical layer connections (Wi-Fi, LAN, carrier network, etc.), knowledge of peers, network costs, network latency, and battery status. For interests sent from forwarding engine 400 to decision layer 450, decision layer 450 can interact with database 455 to determine how to configure FIB 410 to control the forwarding of the outgoing interest toward content that can match the interest.

Decision layer 450 can aggregate information from knowledge of content 460, forwarding policy 465, and contextual information 470. Based on the information available in database 455, connectivity agent 405 can set up the configuration for a new port, for example by creating a tunnel connection over the public Internet.

As an example, consider the arrival of an interest in "www.google.com/michaeljackson/photo/" on port 420-A. The system can perform the following operation to create a new port. The system first receives the interest, which cannot be satisfied by any content in the CS. The system then looks up the interest in FIB 410. If the system does not find a match in FIB 410, the system sends the interest to connectivity agent 405. Within connectivity agent 405, decision layer 450 aggregates information about the content, policy, and available networks from database 455. Specifically, connectivity agent 405 uses knowledge of content 460 (e.g., when the prefix of the identifier associated with the interest's HSVLI is a DNS name), forwarding policy 465 (e.g., try local, use shortest delay or least round trip time, or no constraints on the given collection), and contextual information 470 (e.g., Wi-Fi and adjacent network nodes) from database 455 to determine how to forward the interest.

If the interest's HSVLI contains a domain name, connectivity agent 405 then performs a DNS lookup to discover an IP address to which a tunnel may be created for a network overlay transport. Decision layer 450 then configures forwarding engine 400 to create the new tunnel connection via a respective output port. Decision layer 450 further configures the forwarding information base 410 so that an interest in "www.google.com" will be broadcast first over all available local network ports (to find local copies, if available) and then forwarded (if not already satisfied) on the port corresponding to the overlay tunnel. Subsequently, connectivity agent 405 can re-inject the interest to forwarding engine 400 so that it may be forwarded according to the newly established configuration.

As a second example, consider an interest in obtaining personal financial reports from "www.bankofamerica.com/account/report." Below are the matching criteria within each group that decision layer 450 can use to determine forwarding information. Knowledge of content 480 can use the prefix associated with the interest is a DNS name with content reachable via tunnel. Forwarding policy 465 can determine whether an outside home Wi-Fi network should use a secure encrypted tunnel for a prefix matching "www.bankofamerica.com/account/report." Contextual information 470 can determine an available airport Wi-Fi and/or a carrier network. Connectivity agent 405 can now configure forwarding engine 400 to use a secure tunnel over port 420-c and adding a FIB entry so that these interests are forwarded port 420-c to ensure that no information about the requests is revealed.

Overall System Operation

Figure 5:
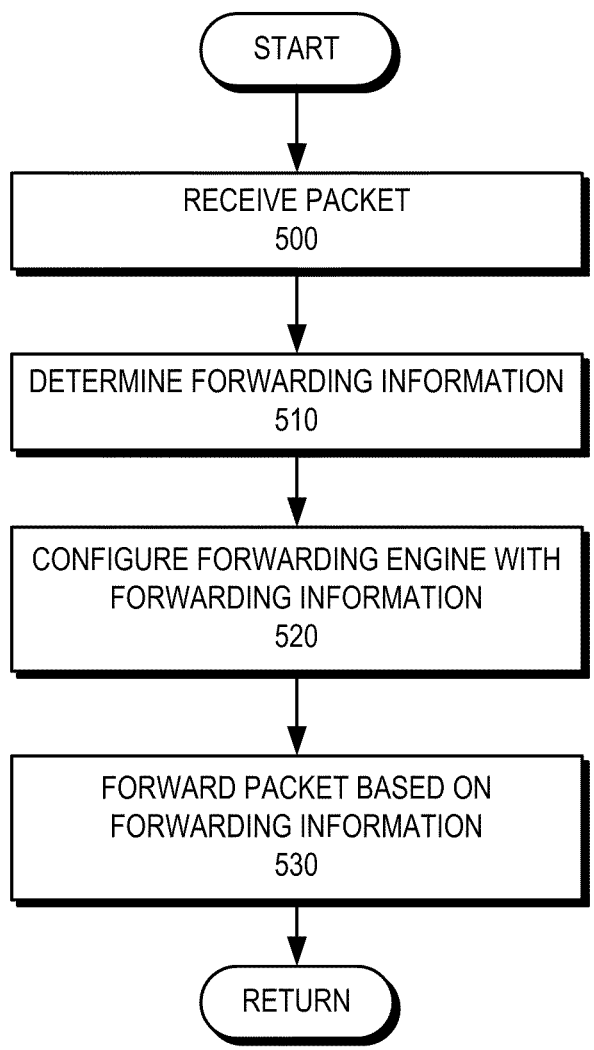
FIG. 5 presents a flow chart illustrating the process of forwarding a packet with an HSVLI in accordance with an embodiment.

FIG. 5 presents a flow chart illustrating the process of forwarding a packet with an HSVLI in accordance with an embodiment. During operation, the system receives a packet which contains an interest for a piece of content with an HSVLI (operation 500). For example, the system can receive the packet at connectivity agent 405 from the forwarding engine 400 or from any port associated with the system. Subsequently, the system determines forwarding information for the HSVLI based on one or more of: knowledge of content 460 which matches the HSVLI, forwarding policy 465, and contextual information 470 about the network (operation 510). Next, the system configures a forwarding engine with the forwarding information (operation 520).

Configuring the forwarding information can involve configuring the entries of FIB 410. For example, FIB 410 can contain prefixes as entries and one or more output ports associated with each entry. The system can also modify an existing entry so that it matches the interest and so that the output port(s) correspond to the forwarding information configured by connectivity agent 405. Subsequently, the system forwards the packet based on the forwarding information (operation 530). Forwarding the packet can involve sending the packet through the output port(s) and as selected by strategy layer 415.

Dynamic Configuration

In some embodiments, the system does not necessarily trigger connectivity agent 405 when it fails to match a received interest in FIB 410. That is, connectivity agent 405 can configure forwarding engine 400 at any time in response to changes in knowledge of content 460, forwarding policy 465, and contextual information 470, which connectivity agent 405 can continuously monitor. For example, the local networks accessible (part of contextual information 470) to a node can change dynamically as the node moves around.

Execution of a routing protocol with other connectivity agents can result in changes to the knowledge of where content under various prefixes can be found. These changes can result in changes to the configuration of FIB 410.

Another source of updates to database 455 is forwarding engine 400, which can provide statistical information to connectivity agent 405. For example, statistical information about consistent round trip delays of retrieving content on different interfaces (ports) might be used by connectivity agent 405 to change priorities of multiple interfaces in FIB 410. One direction of the bi-directional arrow between strategy layer 415 and decision layer 450 denotes the flow of statistical information from strategy layer 415 to decision layer 450.

Active Discovery

Connectivity agent 405 can also perform active operations to update database 455. For example, connectivity agent 405 can periodically or continually run a discovery protocol on local networks to identify nodes with which it can establish secure tunnels for the exchange of information. Furthermore, connectivity agent 405 can discover that a certain mobile node in the network is no longer accessible because the node was moved by its owner.

Figure 6:
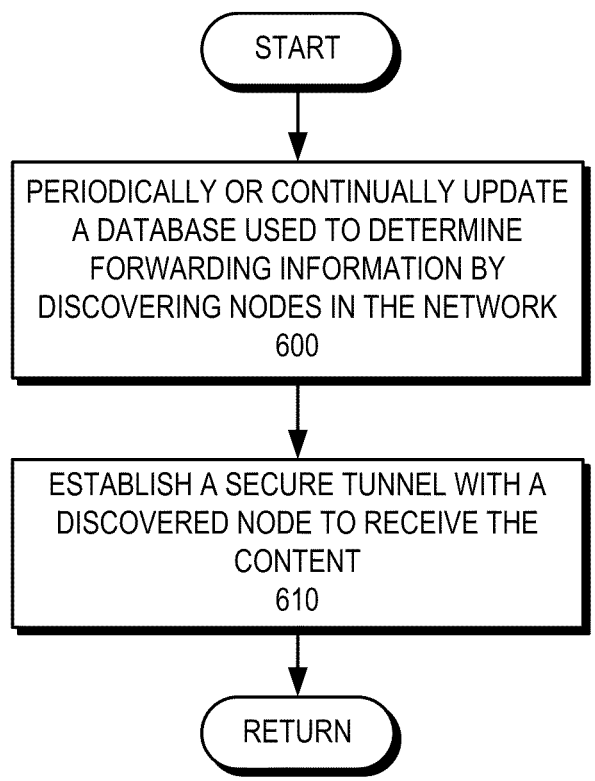
FIG. 6 presents a flow chart illustrating the process of running a discovery protocol to identify a node that provides content and establishes a tunnel thereto, in accordance with an embodiment

FIG. 6 presents a flow chart illustrating the process of running a discovery protocol to identify a node that provides content and establishes a tunnel thereto, in accordance with an embodiment. During operation, the system can periodically or continually update a database (e.g., database 455) to determine forwarding information by discovering nodes in the network (operation 600). Next, the system can establish a secure tunnel with a discovered node to receive the content matching an interest (operation 610).

Controlled Information

The system can configure FIB 410 based on a flow of statistical information and performance information between the strategy layer 415 and decision layer 450. Strategy layer 415 can provide performance-based tuning to exploit multiple connections under changing conditions. Strategy layer 415 can also be used to make last-minute or fine time scale adjustments for port use. As a control mechanism for this closed loop of information flow between strategy layer 415 and decision layer 450, a threshold mechanism can be used to set the conditions for what is working and what is not working based on statistical information and performance feedback data.

The following examples illustrate how decision layer 450 uses information from strategy layer 415 to re-inject interests and reconfigure ports. Decision layer 450 can set a rule to broadcast a particular interest over all available ports. For a subsequent interest, decision layer 450 notifies the forwarding engine 400 to route all outgoing interests to the port leading to a public Wi-Fi. But based on real-time information from strategy layer 415 to decision layer 450 that the Wi-Fi interface is performing poorly, decision layer 450 reconfigures FIB 410 to prioritize an alternative port for a local network that is performing better.

As another example, decision layer 450 can set up new forwarding rules based on historical performance data such as round-trip time (RTT) and layer-2 performance data, stored and collected by strategy layer 415 and forwarded to decision layer 450.

Inter-Node Learning

The system can also learn policies from other devices on the network. Once a device is associated as belonging to a particular family of devices, for example, the system can retrieve and validate configuration information from that device. An example of this is a flow of policy information from that device directly to forwarding policy 465.

The system can facilitate viral propagation of knowledge about devices and policies. For example, the system (which can be located at a node in the network) can request or share information with another authorized node about where a source for a content collection, such as particular pictures, is located in network terms. Such information can include such items as the identifier of the local network(s) to which a source is directly connected and the IP address(es) that a source can use. This contextual knowledge about devices may be used to select and configure connections to them such as overlay tunnels. The node at which the system is located can then propagate this information to another node. In an environment with continuously moving mobile devices (e.g. an airport), dozens of nodes can "infect" each other with such information in a few minutes. For example, node 1 can "infect" node 2, which can "infect" node 3, which can "infect" node 4 and so on.

This viral propagation of knowledge about devices and policies can be enabled by the system's ability to retrieve content by name without knowledge of other nodes and by the system's security model, which can allow secure verification of information to be bootstrapped from a minimal configuration. As another example, a new device can dynamically learn a database from an old replacement device without the need for complete reconfiguration.

Multi-Port Forwarding

The system can forward an interest over multiple ports. That is, the system can attempt to retrieve content via multiple network paths in parallel and without the restriction of forwarding on a spanning tree, which would restrict the forwarding at any one node to a single link. For example, a sequence of interests in the same content collection (e.g., same prefix namespace) can be split over multiple ports. Furthermore, a user might want to download a video before boarding a flight and the interests associated with the video can be distributed over multiple ports simultaneously to improve download time. For example, different segments of the video can be requested by simultaneous interests. As a contrasting example, forwarding policy 465 might specify the use of all available ports for all interests to ensure higher reliability. Decision layer 450 can be responsible for setting up a one-plus-one redundancy.

Apparatus for Adaptive Multi-Use Interface for Content Networking

Figure 7:
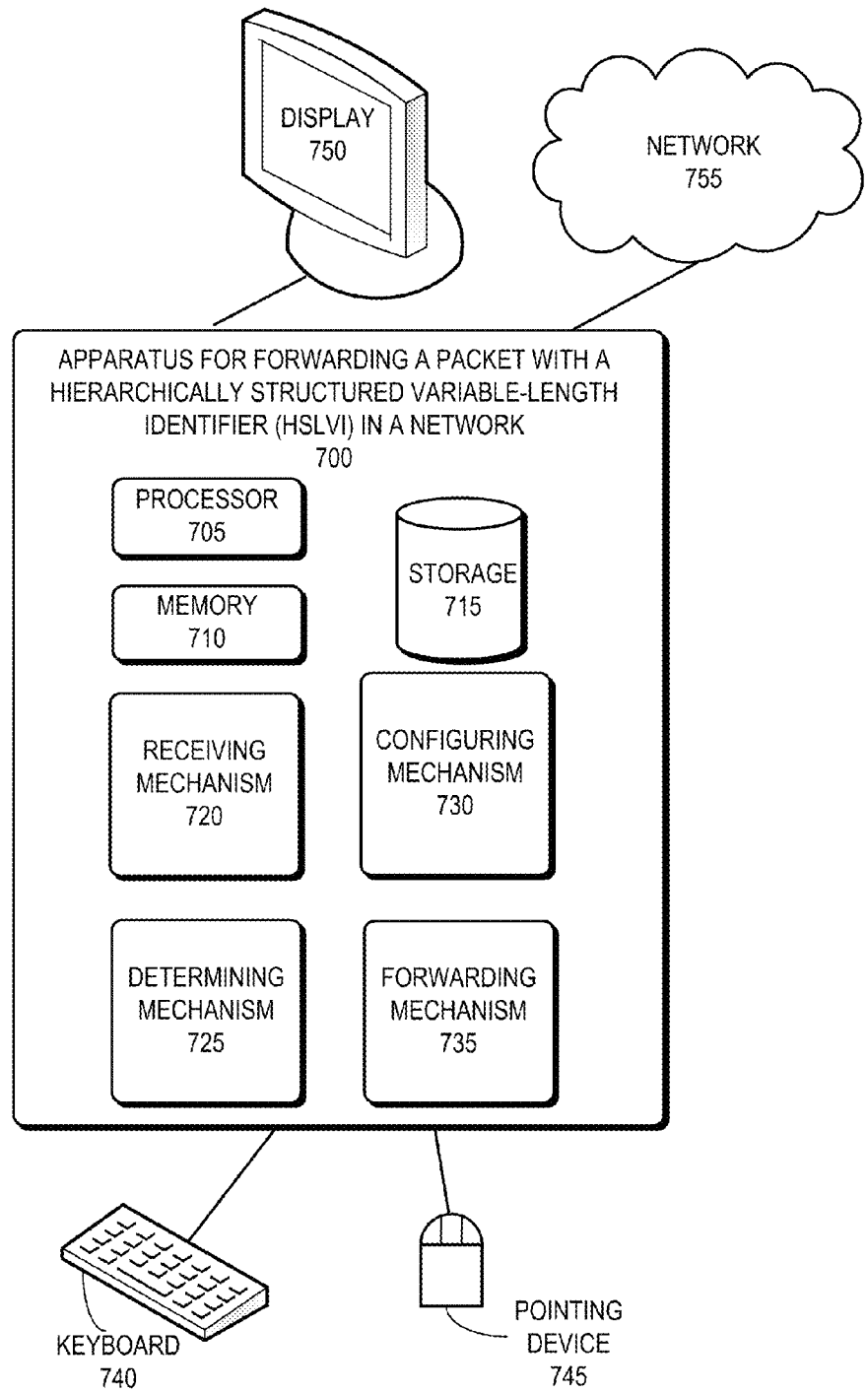
FIG. 7 presents an apparatus for forwarding a packet with an HSVLI in accordance with an embodiment.

FIG. 7 presents an apparatus for forwarding a packet with an HSVLI in accordance with an embodiment.

In accordance with embodiment, apparatus 700 for forwarding a packet with an HSVLI in a network, includes a processor 705, a memory 710, a storage 715, a receiving mechanism 720, a determining mechanism 725, a configuring mechanism 730, and a forwarding mechanism 735, all of which can be in communication with each other through various means.

In some embodiments, mechanisms 720-735 can be part of processor 705. Further, in some embodiments, the system may not include a separate processor and memory. Instead, in addition to performing their specific tasks, mechanisms 720-735, either separately or in concert, may be part of a general-purpose computation engine.

Storage 715 stores programs to be executed by processor 705. Specifically, storage 715 stores a program that implements a system (application) for forwarding a packet with an HSVLI. During operation, the application program can be loaded from storage 715 into memory 710 and executed by processor 705. As a result, apparatus 700 for forwarding a packet with an HSVLI can perform the functions described above. Apparatus 700 for forwarding a packet with an HSVLI can be coupled to an optional display 750, keyboard 740, and pointing device 745. Apparatus 700 is also coupled to network 755, which can be content-centric.

In an embodiment, processor 705 activates receiving mechanism 720 and supplies it with the packet. Next, processor 705 activates determining mechanism 725 and supplies it with the HSVLI indicated by the packet, and optionally with the packet. Subsequently, processor 705 activates configuring mechanism 730 and supplies it with forwarding information obtained from determining mechanism 725. Next, processor 705 activates forwarding mechanism 735 and supplies it with the forwarding information obtained from determining mechanism 725 by re-injecting the interest associated with the packet into the forwarding engine 400 and obtaining the forwarding information from forwarding information base 410.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for forwarding a packet with a hierarchically structured variable-length identifier (HSVLI) in a network, wherein the computer includes a processor, the method comprising:

receiving a packet which contains an interest for a piece of content, wherein the interest includes an address-independent HSVLI;

wherein the HSVLI identifies a specific piece of content without identifying a network address or a storage location for the piece of content, and wherein the HSVLI is hierarchically structured and comprises contiguous name components ordered from a most general level to a most specific level; and determining forwarding information for the packet based on the HSVLI, wherein determining the forwarding information involves:
    identifying a forwarding information entry that has the longest prefix match with the HSVLI by matching the name components of the HSVLI with the name components of the forwarding information entries, wherein the longest prefix match has the largest number of matched name components; and
    determining, from the identified forwarding information entry, one or more interfaces for forwarding the interest; and
forwarding the packet to one or more of the determined interfaces.

2. The method of claim 1, wherein determining the forwarding information for the HSVLI further involves selecting the forwarding information based on knowledge of content which matches the HSVLI, and wherein knowledge of content which matches the HSVLI comprises one or more of:
    location of content which matches the HSVLI;
    availability of content which matches the HSVLI; and
    importance or priority of content which matches the HSVLI.

3. The method of claim 2,
    wherein one or more components of the HSVLI comprise a domain name system (DNS) name; and
    wherein determining the forwarding information comprises determining an output interface based on the DNS name in the HSVLI.

4. The method of claim 1, wherein determining the forwarding information for the HSVLI further involves selecting the forwarding information based on a forwarding policy, and wherein the forwarding policy comprises one or more of:
    a policy rule on content which matches the HSVLI;
    a security constraint on content which matches the HSVLI; and
    a strategy rule to discover a source of content which matches the HSVLI.

5. The method of claim 1, wherein determining the forwarding information for the HSVLI further involves selecting the forwarding information based on contextual information, and wherein the contextual information comprises information about one or more of:
    physical layer connectivity, which includes one or more of: a local-area network (LAN) connectivity, a wireless LAN connectivity, a wide-area network (WAN) connectivity, and other wired or wireless connectivity;
    a peer node which is likely to store content which matches the HSVLI;
    network costs;
    network latency; and
    battery status.

6. The method of claim 1, wherein determining the forwarding information for the HSVLI further involves configuring a forwarding engine with the forwarding information, and wherein the configuration of the forwarding engine is in response to one or more of:
    a status change of the local network;
    execution of a routing protocol based on information received from another node in the network; and
    receiving statistical information indicating delay associated with one or more output interfaces.

7. The method of claim 1, further comprising:
    periodically or continually updating a database used to determine forwarding information by discovering nodes in the network; and
    establishing a secure tunnel with a discovered node to receive the content.

8. The method of claim 1, wherein a component in the contiguous components comprises one or more of:
    a globally routable name;
    an organizational name;
    a version identifier; and
    a digest.

9. The method of claim 1, further comprising forwarding a packet through multiple output interfaces simultaneously.

10. The method of claim 1, further comprising receiving contextual and policy information from a node and virally propagating the contextual and policy information to another node.

11. An apparatus for forwarding a packet with a hierarchically structured variable-length identifier (HSVLI) in a network comprising:
    a processor;
    a memory;
    a receiving mechanism configured to receive a packet which contains an interest for a piece of content, wherein the interest includes an address-independent HSVLI;
    wherein the HSVLI identifies a specific piece of content without identifying a network address or a storage location for the piece of content, and wherein the HSVLI is hierarchically structured and comprises contiguous name components associated with the piece of content ordered from a most general level to a most specific level; and
    a determining mechanism configured to determine forwarding information for the packet based on the HSVLI, wherein determining the forwarding information involves:
        configuring a forwarding engine to identify a forwarding information entry that has the longest prefix match with the HSVLI by matching the name components of the HSVLI with the name components of the forwarding information entries, wherein the longest prefix match has the largest number of matched named components; and
        determining, from the identified forwarding information entry, one or more interfaces for forwarding the interest; and
    a forwarding mechanism configured to forward the packet to one or more of the determined interfaces.

12. The apparatus of claim 11, wherein the determining mechanism is further configured to select the forwarding information based on knowledge of content which matches the HSVLI, and wherein knowledge of content which matches the HSVLI comprises one or more of:
    location of content which matches the HSVLI;
    availability of content which matches the HSVLI; and
    importance or priority of content which matches the HSVLI.

13. The apparatus of claim 12,
    wherein one or more components of the HSVLI comprise a domain name system (DNS) name; and
    wherein determining the forwarding information comprises determining an output interface based on the DNS name in the HSVLI.

14. The apparatus of claim 11, wherein the determining mechanism is further configured to select the forwarding information based on a forwarding policy, and wherein the forwarding policy comprises one or more of:
    a policy rule on content which matches the HSVLI;
    a security constraint on content which matches the HSVLI; and a strategy rule to discover a source of content which matches the HSVLI.

15. The apparatus of claim 11, wherein the determining mechanism is further configured to select the forwarding information based on contextual information, and wherein the contextual information comprises information about one or more of:
- physical layer connectivity, which includes one or more of: a local-area network (LAN) connectivity, a wireless LAN connectivity, a wide-area network (WAN) connectivity, and other wired or wireless connectivity;
- a peer node which is likely to store content which matches the HSVLI;
- network costs;
- network latency; and
- battery status.

16. The apparatus of claim 11, wherein the configuration of the forwarding engine with the forwarding information is in response to one or more of:
- a status change of the local network;
- execution of a routing protocol based on information received from another node in the network; and
- receiving statistical information indicating delay associated with one or more output interfaces.

17. The apparatus of claim 11 further configured to:
- periodically or continually update a database used to determine forwarding information by discovering nodes in the network; and
- establish a secure tunnel with a discovered node to receive the content.

18. The apparatus of claim 11, wherein a component in the contiguous components comprises one or more of:
- a globally routable name;
- an organizational name;
- a version identifier; and
- a digest.

19. The apparatus of claim 11, further configured to forward a packet through multiple output interfaces simultaneously.

20. The apparatus of claim 11, further configured to receive contextual and policy information from a node and virally propagate the contextual and policy information to another node.

21. A non-transitory computer-readable storage medium storing instructions that when executed by a computer cause the computer to perform a method for forwarding a packet with a hierarchically structured variable-length identifier (HSVLI) in a network, the method comprising:
- receiving a packet which contains an interest for a piece of content, wherein the interest includes an address-independent HSVLI;
- wherein the HSVLI identifies a specific piece of content without identifying a network address or a storage location for the piece of content, and wherein the HSVLI is hierarchically structured and comprises contiguous name components associated with the piece of content ordered from a most general level to a most specific level; and
- determining forwarding information for the packet based on the HSVLI, wherein determining the forwarding information involves:
  - identifying a forwarding information entry that has the longest prefix match with the HSVLI by matching the name components of the HSVLI with the name components of the forwarding information entries, wherein the longest prefix match has the largest number of matched name components; and
  - determining, from the identified forwarding information entry, one or more interfaces for forwarding the interest; and
- forwarding the packet to one or more of the determined interfaces.

22. The storage medium of claim 21, wherein determining the forwarding information for the HSVLI further involves selecting the forwarding information based on knowledge of content which matches the HSVLI, and wherein knowledge of content which matches the HSVLI comprises one or more of:
- location of content which matches the HSVLI;
- availability of content which matches the HSVLI; and
- importance or priority of content which matches the HSVLI.

23. The storage medium of claim 22,
- wherein one or more components of the HSVLI comprise a domain name system (DNS) name; and
- wherein determining the forwarding information comprises determining an output interface based on the DNS name in the HSVLI.

24. The storage medium of claim 21, wherein determining the forwarding information for the HSVLI further involves selecting the forwarding information based on a forwarding policy, and wherein the forwarding policy comprises one or more of:
- a policy rule on content which matches the HSVLI;
- a security constraint on content which matches the HSVLI; and
- a strategy rule to discover a source of content which matches the HSVLI.

* * * * *